United States Patent [19]

Johnson

[11] Patent Number: 4,798,133
[45] Date of Patent: Jan. 17, 1989

[54] PACKAGE AND CONTAINER FOR EGGS

[76] Inventor: William N. H. Johnson, 2, Mulberry Clove, Hampstead, London NW 3, United Kingdom

[21] Appl. No.: 874,126

[22] Filed: Jun. 13, 1986

Related U.S. Application Data

[63] Continuation-in-part of Ser. No. 739,321, May 30, 1985, abandoned.

[30] Foreign Application Priority Data

Oct. 16, 1985 [GB] United Kingdom ............... 8525498

[51] Int. Cl.4 .............................................. B65D 85/32
[52] U.S. Cl. ....................................... 99/440; 99/450; 206/620; 220/4 B; 220/23.8; 220/300; 229/2.5 EC; 426/108; 426/109; 426/113; 426/115
[58] Field of Search ............... 229/2.5 EC; 99/336, 99/342, 440, 450; 206/611, 620; 220/23.4, 23.83, 4 B, 23.8, 300, 301, 302; 426/108, 109, 113, 115, 130, 88; D7/7

[56] References Cited

U.S. PATENT DOCUMENTS

| 986,847 | 3/1911 | Nair | 220/301 |
|---|---|---|---|
| 1,497,199 | 6/1924 | Sutthoff | 220/4 B |
| 2,462,956 | 3/1949 | Gross | 220/23.4 |
| 2,472,620 | 6/1949 | Rhodes et al. | 220/301 |
| 2,706,065 | 4/1955 | Stone | 220/4 B |
| 2,844,258 | 7/1958 | Faber | 211/14 |
| 2,874,835 | 2/1959 | Poupitch | 220/23.4 |
| 3,539,071 | 11/1970 | Ludder | 220/23.4 |
| 3,757,674 | 9/1973 | Carroll | 99/440 |
| 3,757,983 | 9/1973 | McCarthy | 220/23.4 |
| 3,831,508 | 8/1974 | Wallard | 99/440 |
| 3,999,946 | 12/1976 | Patel et al. | 426/88 |
| 4,223,789 | 9/1980 | Reil | 229/17 R |
| 4,378,074 | 3/1983 | Brochman | 220/359 |
| 4,494,650 | 1/1985 | Cullen | 220/4 B |
| 4,553,667 | 11/1985 | Hudson et al. | 220/302 |
| 4,632,299 | 12/1986 | Holmberg | 229/17 R |

FOREIGN PATENT DOCUMENTS

| 4932 | 10/1979 | European Pat. Off. | 206/626 |
|---|---|---|---|
| 697713 | 1/1931 | France . | |
| 1562718 | 2/1969 | France | 229/17 R |
| 2405679 | 5/1979 | France . | |
| 194525 | 2/1965 | Sweden | 229/7 R |
| 568898 | 11/1975 | Switzerland | 229/7 R |
| 1067245 | 4/1964 | United Kingdom . | |
| 974363 | 11/1964 | United Kingdom | 229/17 R |
| 990332 | 4/1965 | United Kingdom | 220/23.4 |
| 1077440 | 6/1966 | United Kingdom . | |
| 2130179 | 5/1984 | United Kingdom . | |

Primary Examiner—Stephen Marcus
Assistant Examiner—Gary E. Elkins
Attorney, Agent, or Firm—Spencer & Frank

[57] ABSTRACT

A container for eggs defines a plurality of compartments each of a configuration to hold an egg captive, each portion of the container defining a respective single said compartment being connected with the remainder along lines of weakening, perforation or the like, whereby each said portion, with an egg retained in the respective compartment can be readily detached from the remainder of the container, to form a discrete sub-container for a single egg which is adapted to hold said egg captive, at least a portion of said sub-container being readily removable to allow access to the egg therein while the remainder of the sub-container acts as an egg cup. The invention also provides a method of cooling and subsequently serving an egg whilst the egg is enclosed in a permeable container.

4 Claims, 3 Drawing Sheets

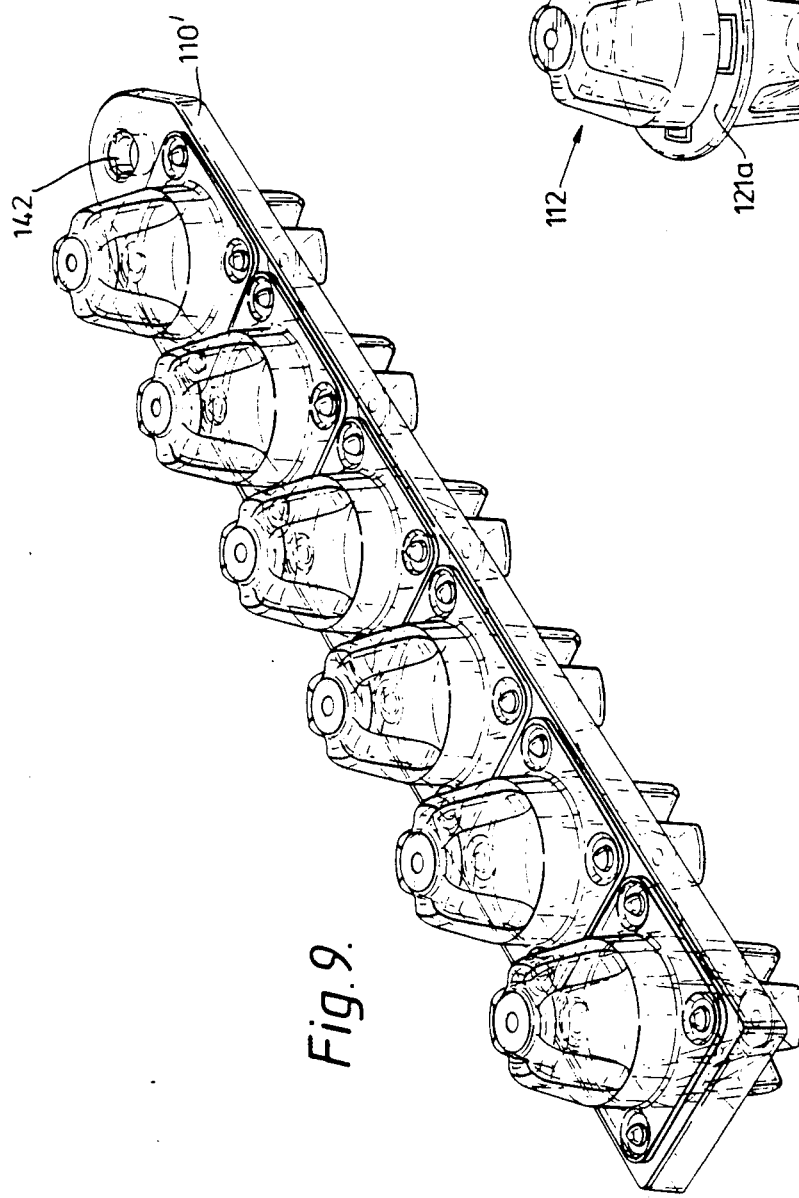

PACKAGE AND CONTAINER FOR EGGS

This application is a continuation-in-part of U.S. patent application Ser. No. 06/739,321, filed May 30th, 1985, now abandoned.

BACKGROUND OF THE INVENTION

This invention relates to a container for eggs.

SUMMARY OF THE INVENTION

It is an object of the present invention to provide a container for eggs, by the use of which the labour involved, in catering establishments and the like, in extracting eggs from the container in which they are normally supplied, boiling the eggs, transferring the same to egg cups for serving and subsequent washing up of the egg cups may be avoided.

It is another object of the invention to provide a method of cooking and subsequently serving an egg, utilising a container according to the invention.

According to one aspect of the invention there is provided a container for eggs, defining a plurality of compartments each of a configuration to hold an egg captive, each portion of the container defining a respective single said compartment being connected with the remainder along lines of weakening, perforation or the like, whereby each said portion, with an egg retained in the respective compartment, can be readily detached from the remainder of the container, to form a discrete sub-container for a single egg, adapted to hold said egg captive, at least a portion of said sub-container being readily removable to allow access to the egg therein while the remainder of the sub-container acts as an egg cup.

According to another aspect of the invention there is provided a method of cooking and subsequently serving an egg comprising placing the egg, whilst enclosed in and held captive in, a permeable container, in water, cooking the egg by boiling the water, removing the container with the egg still retained therein after a desired period, and serving the egg in said container, with said container acting as an egg cup.

BRIEF DESCRIPTION OF THE DRAWINGS

An embodiment of the invention is described below with reference to the accompanying drawings in which:

FIG. 9 is perspective view of another form of egg package embodying the invention; and FIG. 10 is a perspective view of a variant individual egg container.

DESCRIPTION OF THE PREFERRED EMBODIMENTS

Figure 1:
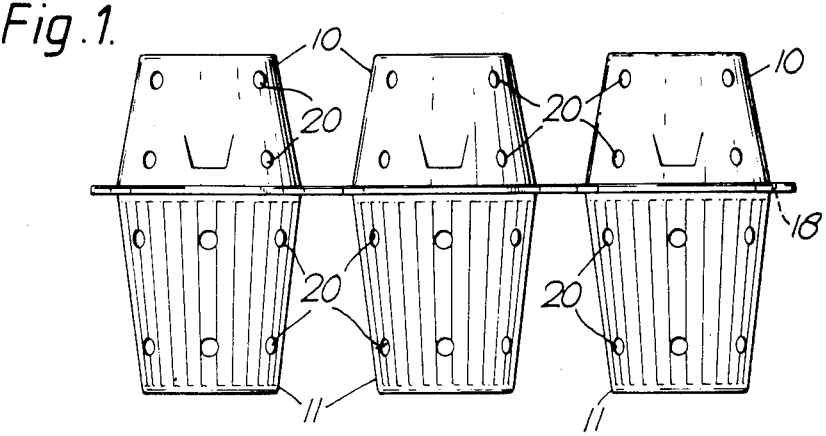
FIG. 1 is a side elevation view of a container embodying the invention.
Figure 2:
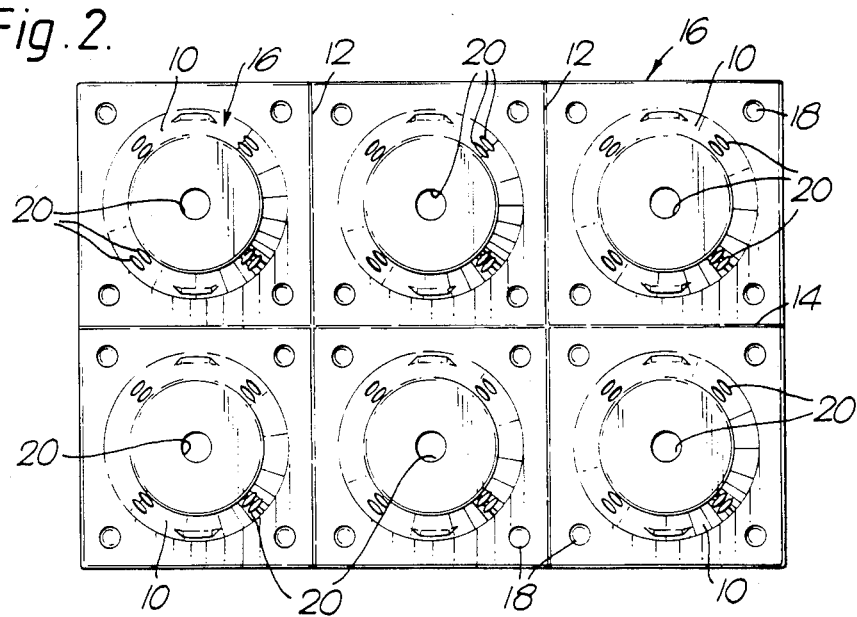
FIG. 2 is a plan view of the container.

Referring to FIGS. 1 and 2, a container for six egg comprises an upper portion 10 and a lower portion 11, of sheet plastics material deformed to provide, in generally the same way as in conventional egg containers, six egg-receiving pockets in the lower portion 10 and six egg-receiving pockets in the upper portion 10, each lower pocket, in use, serving, with a respective upper pocket, to define a compartment for an egg.

As shown in FIG. 2, lines of perforation or weakening 12, 14, in the upper and lower portions 10, 11, divide each egg-containing compartment off from the adjoining compartments, and thus divide the container into six sub-containers 16, the arrangement being such that a desired sub-container may be separated from the remainder by tearing the upper and lower portions 10 and 11, as one, along the appropriate lines 12, 14.

In order that each sub-container shall maintain its integrity when torn off from the remainder of the container, the upper and lower parts thereof are held together by appropriate retaining means, for example, by inter-engaging press-fastening formations, 18, of a type known per se in egg containers, provided at the four corners of each sub-container as viewed in FIG. 2, or possibly provided only at two diagonally opposite corners.

Both the upper and the lower portion of each sub-container is preferably provided with perforations or apertures 20 therein.

Figure 3:
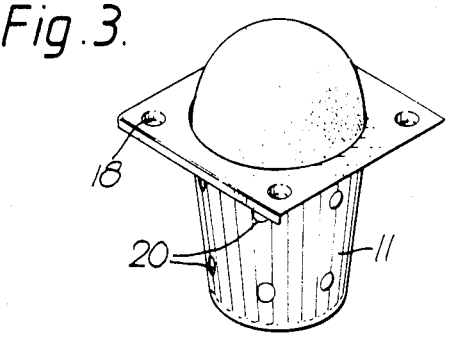
FIG. 3 illustrates the lower portion of a sub-container, acting as an egg cup, with an egg in position, said sub-container forming part of the container of FIGS. 1 and 2.

The supply of eggs in egg containers of the form shown in FIGS. 1 and 2 allows the boiling of individual eggs to be effected very simply by tearing, from the container, the respective sub-container containing an egg and placing the sub-container, with the egg therein, in boiling water for the appropriate period of time, (usually four minutes), the apertures 20, and the gaps normally present between the upper and lower parts of the sub-container, allowing the entry of boiling water to cook the egg. After having been boiled for the requisite time, the sub-container, with its egg, may be lifted from the boiling water and served directly, the person who is to eat the egg simply removing the upper part of the sub-container from the lower by pulling off in order to gain access to the egg, the lower part of the sub-container, as shown in FIG. 3, serving as an egg cup.

The two portions of the sub-container are, of course, simply discarded after use, so that the necessity for washing up egg cups is avoided.

As shown in the drawings, the lower part of each sub-container, which is to serve as the egg cup, is preferably made of greater depth than the upper part, for effective support of the egg during use as an egg cup, and the lower part of each sub-container preferably has its peripheral wall formed with vertically extending flutes or corrugations in order to provide thermal insulation between the egg supported by the lower part of the sub-container and the hand of a person supporting the lower part of the sub-container from the outside.

If desired, instead of the whole of the upper part of the sub-container being removed to allow access to the egg, an upper portion of each upper part of each sub-container may be connected with the remainder via a line of weakening or perforation and may have a portion affording a tag which can be grasped to allow said upper portion to be torn off, thereby allowing access to the egg, which is nevertheless held captive within the sub-container.

It will be appreciated that since the opening of the six-egg container in the conventional manner by pivoting the upper part relative to the lower part about a flexible "hinge" strip along one side of the container, such a hinge strip will not normally be provided so that the upper and lower parts of the six-egg container will normally be connected only via the cooperating fastenings 18.

There is thus not, in principle, any limitation on the number of egg spaces which may be provided in a container, and for catering establishments and the like the use of the container affording 24 egg spaces, (i.e. 6×4) may be preferred.

Figure 4:
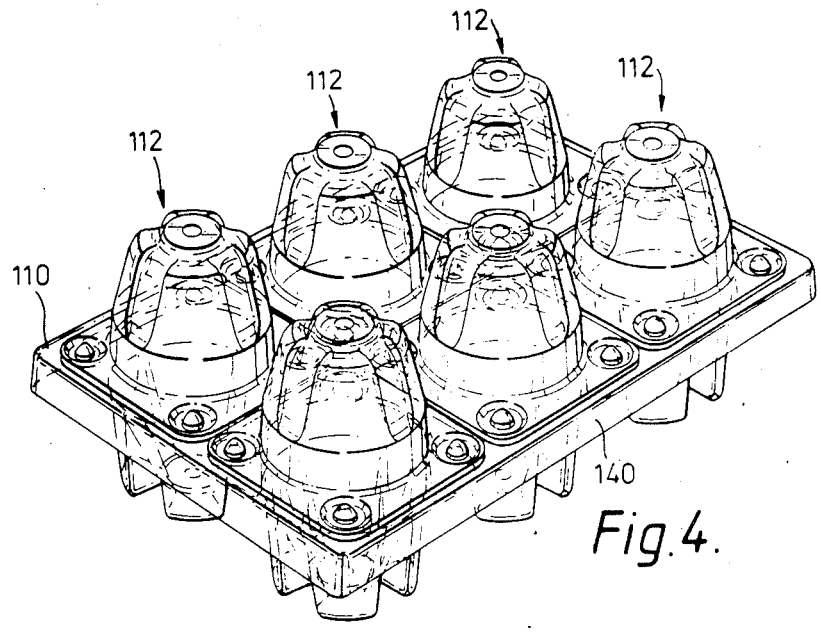
FIG. 4 is a perspective view of a further form of egg package embodying the invention.
Figure 5:
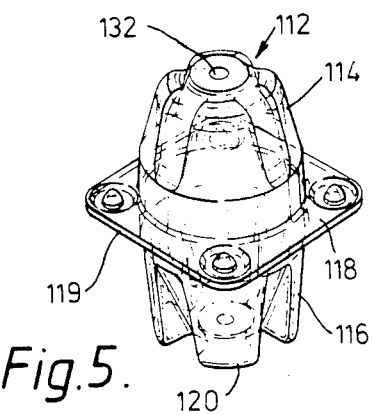
FIG. 5 is a perspective view of an individual egg container forming part of the package of FIG. 4.
Figure 6:
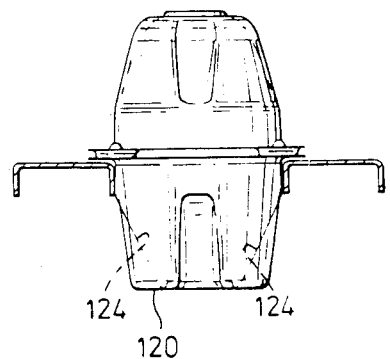
FIG. 6 is a fragmentary view, partly in side elevation and partly in vertical section, of part of the package of FIG. 4.
Figure 7:
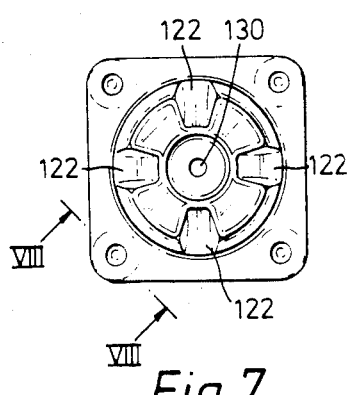
FIG. 7 is a plan view from below of the individual container of FIG. 5.

Referring to FIG. 4, a package for eggs comprises a rectangular tray 110 provided with circular apertures in which are fitted the lower parts of respective egg containers 112. As shown in FIGS. 5 to 8, each egg container 112 comprises an upper part 114 and a lower part 116 each formed by drawing or moulding sheet plastics material into the form of a cup having around the rim thereof a planar flange 118, 119 respectively having, in plan, the form of a square with rounded corners, said flange lying substantially in the plane of the stock sheet material from which the respective part of the container is formed. The lower part 116 of each egg container has a relatively wide base 120 but has, as viewed externally (see FIG. 7) four channels 122 extending obliquely from the side wall of the lower container part to the base 120, these channels affording, on the interior of the container, corresponding ribs affording inclined support surfaces 124 to support an egg. The lower part 116 is thus relatively stable, allowing the container, or the lower part 116 to stand on its own with an egg therein and yet is configured to provide, internally, adequate support for an egg. The upper part 114 of each container may be, as shown, somewhat more rounded as viewed in side elevation as it does not have to be capable of standing in a stable manner on its own, but if preferred it may have substantially the same form as the lower part 116.

Figure 8:
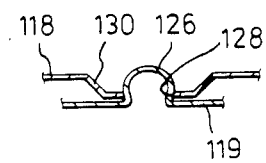
FIG. 8 is a detailed sectional view, to an enlarged scale, of part of the container of FIGS. 5 and 7, in section along the line V—V of FIG. 7.

In the closed condition of the container, the rectangular flanges 118, 119 of the container parts 114 and 116 respectively are superimposed in parallel and closely adjoining relationship by means of snap-fit formations provided in the four corners of the rectangular flanges, each said formation comprising, as shown in FIG. 8, a moulded stud or pimple 126 extending upwardly from the lower flange 119 and snapped resiliently into a complementary aperture 128 formed in the bottom of a depression 130 in the upper flange 118. The peripheral wall of the stud or pimple 126 is flared upwardly and outwardly slightly so as to secure the desired snap fastening action by virtue of the resilience of the plastics sheet material. The lower part 116 has a central aperture 130 in the base thereof, the upper part 114 has a central aperture 132 in its top and these apertures, together with the spaces defined between the flanges 118 and 119 (see FIG. 8) ensure that when the individual container, with an egg therein, is dropped into boiling water, the air within the container may escape and boiling water may have access to the egg to cook the same.

The tray 110 is also formed from sheet plastics material by moulding or drawing and simply comprises a flat rectangular top wall surrounded by a downwardly depending side wall 140, the top wall being formed with six circular apertures, each surrounded by a downwardly depending circumferential wall which forms a collar or sleeve which embraces, as a frictional fit, the side wall of the lower part 116 of a container 112 pushed therein from above.

In the embodiment of FIG. 4, the holes in the tray 110 are arranged in a three by two array and the pitch between adjacent holes is such that when containers 112 are inserted in the holes the free edges of the sides of the flanges 118, 119 of adjacent containers lie closely adjacent to one another.

In the arrangement of FIG. 9, the tray 110' has six holes therein arranged in a single row to support six egg containers 112, likewise arranged in a single row. The tray 110' is provided at one end with a smaller hole 142 by which, for example, the tray, with the eggs therein, may be suspended from a convenient support.

The supply of eggs in egg containers of the form shown in FIGS. 4 to 9 allows the boiling of individual eggs to be effected very simply by removing, from the tray 110, 110', the respective container 112 containing an egg and placing the container 112, with the egg therein, in boiling water for the appropriate period of time, (usually four minutes), the apertures 130, 132, and the gaps present between the upper and lower flanges 118, 119 allowing the entry of boiling water to cook the egg. After having been boiled for the requisite time, the container, with its egg, may be lifted from the boiling water and served directly, the person who is to eat the egg simply removing the upper part 112 of the container from the lower by pulling off in order to gain access to the egg, the lower part 116 of the container serving as an egg cup.

The two portions of the container 112 are, of course, simply discarded after use, so that the necessity for washing up egg cups is avoided.

FIG. 10 shows an alternative form of the egg container 112, in which the upper container part, indicated at 114a is connected with the lower container part, indicated at 116a by a bayonet-type connection formed by providing the lower container part with a rolled-over peripheral flange 119a having a lower portion extending outwardly from the upper end of the body of the lower container part, and an upper portion extending inwardly again from the outer part of said lower portion to afford a radially inwardly open annular channel 121a defined between said upper and lower portions of said peripheral flange, within which channel 121a are engaged lugs 118a extending outwardly from the lower edge of the upper container part 114a.

The upper portion of the rolled-over flange 119a has slots 12a cut in its inner edge portion which correspond in angular spacing and extent to the lugs 118a, so that the upper and lower container parts can be brought together or separated with the lugs 118a aligned with said slots 120a and, once brought together, can be secured by twisting the upper part relative to the lower part to move the lugs out of register with the slots.

Preferably the plastics material of the containers of FIGS. 1 to 3 or of the containers 112 of FIGS. 4 to 10 is adapted to undergo a readily visible colour change after it has been subjected to boiling water for the time required to cook an egg, e.g. for four minutes, so that the cook can determine, simply from observing the colour of the plastics container being boiled, with its egg, whether or not the egg has been fully cooked. The desired colour change may be afforded either by incorporating a suitable pigment or chemical in the plastics material itself, or, alternatively, each container may have affixed thereto a piece of an appropriate indicator material.

In order to facilitate the cracking of an uncooked egg the inner walls of both the upper and lower portions of each container may be adapted to grip the egg. In this way the two portions of the container provide a reinforcement of the egg shell so that a firm hold can be taken of the egg without risk of crushing the egg during the cracking operation, For example the inner walls could be sculptured to provide a friction grip on the egg that is sufficient to provide a purchase on the egg, but is sufficiently weak to enable the upper portion of the container to be easily removed as described above so that the lower portion can function as an egg cup.

When an egg-cracking operation has been completed, the yoke and white emptied from the shell, both the shell segments and the two portions of the container can be discarded.

Egg containers as described with reference to the drawings may be utilised in the home, but would be particularly suitable for establishments in which large scale catering is undertaken, for example in restaurants and hotels, as well as in hospitals, for example, old-age pensioners and children's hospitals, in schools, etc.

It will be appreciated that, if desired, all of the eggs in a six-egg container or a larger multiple egg-container may be cooked simultaneously in a suitable vessel, with, in the case of FIGS. 1 to 3, the sub-containers being torn off after cooling but just prior to serving, or, in the case of FIGS. 4 to 10, the containers 112 being removed from the trays 110, 110' after cooking but just prior to serving. The packages described may thus, for example, be useful in the preparation of picnics etc.

It will be understood that the above description of the present invention is susceptible to various modifications, changes and adaptations, and the same are intended to be comprehended within the meaning and range of equivalents of the appended claims.

What is claimed is:

1. A package for eggs, comprising:
   a plurality of containers detachably connected to one another, each of the plurality of containers being comprised of an upper portion and a lower portion, wherein the upper portion and the lower portion each have:
   (a) the form of a cup configured to define a chamber therein suitable for holding an egg when the upper portion and the lower portion are engaged with one another,
   (b) a rim part comprised of a planar flange and means for retaining the planar flange of the upper portion engaged with the planar flange of the lower portion,
   (c) at least one perforation defined therethrough to permit ingress and egress of water when the package is immersed in water to boil eggs contained therein, and
   (d) a composition which is capable of withstanding the temperature of boiling water without losing structural integrity, which composition is comprised of a plastic material, and
   wherein each lower portion has a side wall, which side wall has one of vertically extending flutes and vertically extending corrugations configured to grip an egg positioned therein and effective to provide thermal insulation between the egg and a person supporting the lower portion by hand from outside, and
   wherein the detachable connection of the plurality of containers is achieved by providing between adjacent containers one of lines of weakening and lines of perforations whereby each of the plurality of containers may be detached so that the lower portion thereof may function as an egg cup.

2. The package according to claim 1, wherein the means for retaining the planar flange of the upper portion engaged with the planar flange of the lower portion is comprised of at least two press fasteners, each press fastener being comprised of a stud provided on the upper portion or the lower portion and a complementary aperture provided on the other of the upper portion or the lower portion into which complementary aperture the stud snaps resiliently.

3. The package according to claim 2, wherein at least a part of the package comprises a means for visual indication of when the package has been subjected to boiling water for a predetermined period of time.

4. The package according to claim 1, wherein at least a part of the package comprises a means for visual indication of when the package has been subjected to boiling water for a predetermined period of time.

* * * * *